Nov. 24, 1959 E. R. ANDREOTTI ET AL 2,913,819
POWDERED METAL ARMATURE
Filed Aug. 26, 1957
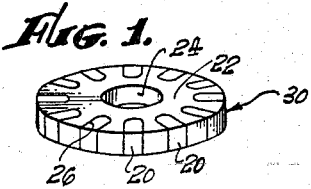
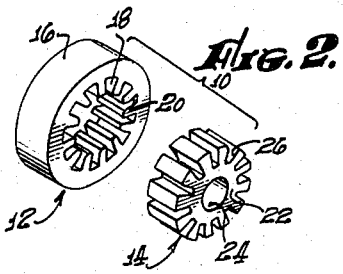
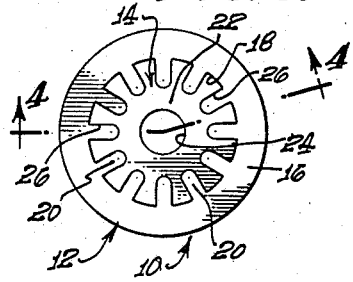
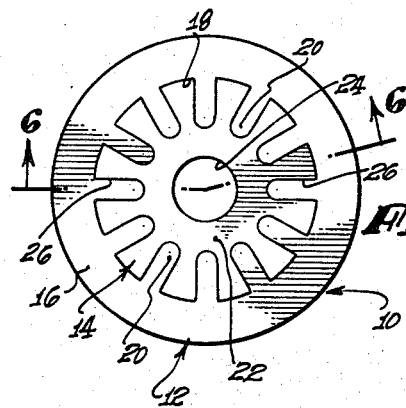
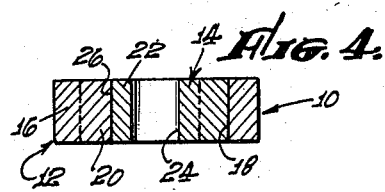
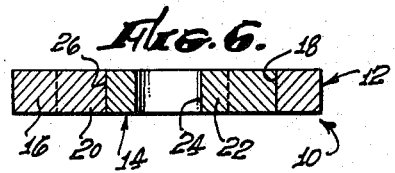
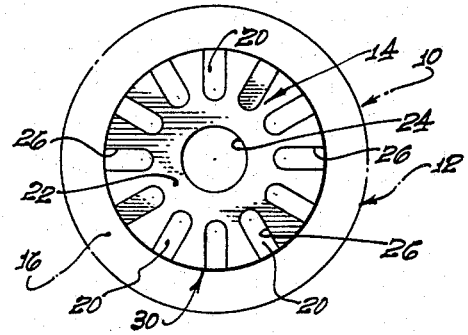
EUGENE R. ANDREOTTI,
JOHN MIKITKA,
INVENTORS.
By Thomas P. Maloney.
ATTORNEY.

United States Patent Office 2,913,819
Patented Nov. 24, 1959

2,913,819

POWDERED METAL ARMATURE

Eugene R. Andreotti, Anaheim, and John Mikitka, Garden Grove, Calif., assignors, by mesne assignments, to The American Hardware Corporation, New Britain, Conn., a corporation of Connecticut Application August 26, 1957, Serial No. 680,348

2 Claims. (Cl. 29—420.5)

This invention relates to a powdered metal armature and to the method of fabricating the same. While the principles of the invention are disclosed as being utilized in fabricating an armature adapted to be incorporated in a dynamoelectric machine, it is, of course, obvious to those skilled in the art that the principles and practices of the invention will be applicable with equal cogency to analogous constructions and we, therefore, do not intend to limit the invention to the particular embodiment thereof which is shown and disclosed hereinbelow.

In the fabrication of armatures for various types of electric motors, and particularly for relatively small sized electric motors, it is customary to utilize a core member constituted by a magnetic body having a plurality of radially oriented slots formed in the periphery thereof. There are then inserted into each of the slots brass or other nonmagnetic segments which are retained in operative relationship with the core member by staking or peaning the areas of the core member adjacent said slots over the segments mounted in said slots.

The construction described hereinabove is particularly characteristic of small sized fractional horsepower motors wherein extremely high rotational speeds are customary and thus it frequently happens that the individual segments break loose from their mechanical connection with the mounting core therefor to destroy the armature and the motor in which the conventionally fabricated armature is utilized. Since such motors are frequently incorporated in aircraft and other highly critical devices wherein the failure thereof is tantamount to the destruction of the entire device, the implications of such break down of the armature in conventional fractional horsepower motors of the character under consideration here are obvious.

It is, therefore, an object of our invention to provide an armature for dynamo-electric machines of the character of the fractional horsepower motors discussed hereinabove which includes a core formed from powdered metal, said core incorporating a plurality of radial slots and adapted to be placed in internested relationship with a core ring also formed of powdered metal and having a plurality of inwardly radiating lugs adapted to be received in the slots of the aforementioned core. Either the core or the core ring can be fabricated from a ferromagnetic material which is compressed under relatively high pressures into a compact of the ultimate shape of the core ring or core and which is then subjected to sintering at conventional temperatures and under conventional atmospheres to render said core or core ring heat stable when subjected to additional sintering operations, as described hereinbelow.

For instance, if the core ring is fabricated from ferromagnetic material and subjected to the sintering operation described hereinabove, the core is fabricated from intermixed tin and copper powders which are formed into a compact under high pressure and which compact is left in the unsintered or green state. The unsintered core member is then internested with the previously sintered ferro-magnetic core ring, the inwardly radiating lugs on said core ring being received in the outwardly radiating slots provided in said core ring and there being approximately .001 inch clearance between the ring and core member to allow said members to be internested.

It is well known to those skilled in the art that compacts fabricated from intermixed tin and copper powders result in a bronze matrix which is both nonmagnetic and which is characterized by expansion of the compact during the sintering operation. The extent to which the compact is compressed during the formation thereof in an appropriate die determines the ultimate density of the compact and the greater the density of the compact, the greater will be the subsequent expansion thereof during the sintering operation.

After the core ring and core member are internested in the above described manner, the internested parts are subjected to conventional sintering temperatures and the sintering action, while ineffective to materially alter the dimensions of the previously sintered ferrous core ring, acts upon the copper-tin core member to cause expansion of the same into a physical bond with the adjacent areas of the core ring. In this manner the individual inwardly radiating lugs on the core ring are locked in intimate association with the adjacent surfaces of the slots in the core member, for a purpose which will be described in greater detail below.

There is thus achieved, by the above described sequence of operations, an armature blank which can be subsequently coined and then placed in a lathe or other machine tool to cut away the annular ring portion of the core ring and to expose the alternate magnetic and nonmagnetic segments constituted, respectively, by the ferrous core member and the bronze lugs securely mounted in the slots in said ferrous core member. It is also contemplated that the core ring be fabricated from a nonmagnetic material such as prealloyed brass powders and assembled after compaction in the green state in internested relationship with a core member fabricated from ferro-magnetic powders. When the internested members are subjected to sintering temperatures within conventional ranges, the prealloyed brass core ring shrinks in accordance with the density of the compaction thereof into a mechanical bond with the previously sintered heat stable core member. Subsequently, the annular ring portion of the core ring is removed in the above described manner.

There thus results from the method of our invention an armature which is characterized by the tenacity with which the nonmagnetic segments or lugs are retained in the slots of the core member with which they are associated or, in the case where the core ring is formed from magnetic material, the tenacity with which such magnetic segments or lugs are retained in the slots in the nonmagnetic core member. Obvious manufacturing economies arise from the simultaneous assembly of all of the segments in operative relationship with the core member and the performance characteristics are always far superior to those of conventional armatures.

Other objects and advantages of the invention will be apparent from the following specification and the accompanying drawing which is for the purpose of illustration only and in which:

Fig. 1 is a perspective view showing an armature of our invention;

Fig. 2 is an exploded view showing the core ring and core member prior to the internesting thereof;

Fig. 3 is a top plan view of the core and ring members in internested relationship;

Fig. 4 is a transverse sectional view taken on the broken line 4—4 of Fig. 3;

Fig. 5 is a top plan view of the armature blank after it has been subjected to a coining operation in accordance with the method of our invention;

Fig. 6 is a transverse sectional view taken on the broken line 6—6 of Fig. 5; and Fig. 7 is a top plan view schematically illustrating the manner in which the core ring portion of the core ring is removed to expose the segments or lugs of said core ring as deposited in the slots of said core member.

Referring to the drawing and particularly to Figs. 2–3 thereof, we show an armature blank 10 constructed in accordance with the teachings of the invention, said armature blank including an outer ring 12 and an inner core member 14, said outer ring 12 including an outer ring portion 16 defining a centrally located opening 18 and having a plurality of inwardly radiating lug portions 20 formed integrally therewith.

The core member 14 is circular in configuration and includes a central body portion 22 having a centrally located opening or bore 24 formed therein for the reception of a mounting shaft, or the like, not shown. The periphery of the core member 14 is provided with a plurality of outwardly opening radial slots 26 symmetrically arranged and equaling in number the inwardly projecting radial lugs 20 on the ring 12 so that, when said ring 12 and core member 14 are internested in the manner shown in Fig. 3 of the drawing, the lugs 20 are received in the slots 26.

The ring 12 is fabricated by the use of pure iron powdered metal which is compacted by molding it in a die of the appropriate shape under pressures between 25 to 50 tons per square inch. After the compact constituting the ring 12 has been created by molding the ring to approximately 83% density, the ring is sintered at temperatures between 2000° F. and 2050° F. for a period of approximately 15 to 60 minutes in an atmosphere constituted by dissociated $NH_3$. Upon the completion of the sintering process of the ring it is relatively heat stable at the sintering temperatures and will neither expand nor contract when subjected to such temperatures.

The core member 14 is formed in an appropriately shaped die from intermixed tin and copper powders at a pressure between 15 to 25 tons per square inch. We have found that 20 tons per square inch is the optimum pressure for forming the compact constituting the core member portion.

The core member 14 in the green or unsintered state is then inserted in the opening 18 in the ring 12 with the inwardly radiating lug portion 20 on the ring 12 being received in the radial slots 26 of the core member 14. The ring 12 and core member 14 are so sized as to allow for approximately .001 inch clearance between the parts so that a slip fit may be obtained. Thus, the core member 14 is internested with the ring 12 and the internested assembly is sintered in an appropriate atmosphere at temperatures between 1450° F. and 1600° F. for a period between 15 to 20 minutes.

During the sintering of the internested compacts constituting the ring 12 and the core member 14, expansion of the bronze matrix resulting from the intermixed tin and copper powders of the core member 14 results, creating a physical bond between the core member 14 and the ring 12. Of course, if the core member 14 is compressed to relatively high densities, greater expansion of the core member 14 within the ring 12 will result during the final sintering step. On the other hand, correspondingly less expansion will result from correspondingly lower densities. Thus, the pressures at which the core member 14 is molded to create the core member compact directly control the extent to which the core member will expand during the final sintering step. In any event, expansion in varying degrees is always characteristic of the tin-copper powder mixture above a predetermined minimum density, as is well known to those skilled in the art.

After the final sintering step has been accomplished, the blank 10 is subjected to a coining action to create a minimum density in the iron of approximately 90%. After the coining action, the blank 10 is placed in a lathe or similar cutting machine to remove the outer ring portion 16 from the lugs 20 with which it is integrally formed. The ring portion 16 being cut away, the lugs 20 in the radial slots 26 are exposed to create the armature 30, as best shown in Figs. 1 and 7 of the drawing. The individual lugs 20 thus constitute nonmagnetic segments or bars interposed between the magnetic portion of the core member 14.

If desired, the sintered iron ring 12 may be coined at pressures between 20 and 60 tons per square inch after the original sintering thereof in order to increase its density and can then be re-sintered at temperatures between 2000° F. and 2050° F. for between 15 to 60 minutes.

When thus coined and re-sintered, the density of the iron rings 12 is raised to between 90–94% and the increased density of the ring in this regard may possibly facilitate a brazing relationship between the ring 12 and the core, brazed bond between the ring and the core being created when said members are simultaneously subjected to sintering temperatures. Thus the mechanical-physical bond is augmented by the brazed bond between the ring 12 and the core member 14.

Although we have described the utilization of a ring 12 fabricated from pure iron powder and its conjunctive use with a core member 14 formed from a combination of tin and copper powders resulting ultimately in a bronze matrix, the use of other materials in the ring or core member is contemplated. For instance, it is conceivable that the core member 14 be itself fabricated from pure iron powder and subjected to the same compressing and sintering steps as those to which the iron ring 12 was originally subjected, as described hereinabove. Then, instead of utilizing an iron ring, the ring 12 can be fabricated from prealloyed brass compressed to a density sufficient to permit the brass to contract during the last sintering step when the brass ring 12 and the iron core member 14 are assembled in internested relationship.

Of course, the brass ring is assembled with the previously sintered iron core in the green state so that when the internested ring and core member are subjected to the final sintering step the sintering temperatures to which the brass ring is exposed will cause the contraction thereof to create a mechanical bond between the brass ring and the iron core member which has been previously sintered.

We thus provide by our invention a blank constituted by powdered metal compacts, one of which has been previously sintered to render it relatively heat stable and the other of which is assembled in internested relationship with the previously sintered compact and subjected to sintering temperatures to cause it to expand or contract into a physical and, in some cases, a brazed bond with the associated heat stable compact. In the case of the armature blank described hereinabove, a ferro-magnetic material is utilized in conjunction with a nonmagnetic metal in order to achieve the desired armature characteristic, but it is conceivable that in the use of the method of our invention metals having different characteristics than those described hereinabove may be utilized.

We claim as our invention:

1. In a method of making an armature blank, the steps of: forming a first member from powdered metal and sintering the same to fully sinter the powdered metal constituting said first member; forming a second member from powdered metal and leaving it in the green state, said second member's powdered metal being permanently expansible by exposure to sintering temperatures between 2000° F. and 2500° F.; internesting said members; subjecting said internested members to sintering temperatures to expand said green member into a physical bond with said first member to sinter said green member; and removing a sufficient portion of the outer of said members to expose portions of the inner one thereof.

2. In a method of making an armature blank, the steps of: forming a first member from powdered iron and sintering the same to fully sinter the powdered metal constituting said first member; forming a second member from intermixed tin and copper powders and leaving it in the green state, said second member's powdered metal being permanently expansible by exposure to sintering temperatures, said first and second members having interlocking radial lugs; internesting said members with said second member inside said first member; subjecting said internested members to sintering temperatures to expand said green member into a physical bond with said first member by sintering said green member; and removing a sufficient portion of said second member to expose said internested lugs.

References Cited in the file of this patent

UNITED STATES PATENTS

| | | |
|---|---|---|
| 1,766,865 | Williams et al. | June 24, 1930 |
| 1,991,046 | Bohli | Feb. 12, 1935 |
| 2,387,073 | Horlacher | Oct. 16, 1945 |
| 2,652,520 | Studders | Sept. 15, 1953 |